United States Patent [19]
Bernhardt et al.

[11] 3,726,256
[45] Apr. 10, 1973

[54] DEMOUNTABLE HORSE CORRAL AND TRAILER STRUCTURE

[75] Inventors: Blaise Bernhardt, Woodland Hills; Donald House, Sun Valley, both of Calif.

[73] Assignee: said Bernhardt, by said House

[22] Filed: July 12, 1971

[21] Appl. No.: 161,740

[52] U.S. Cl. ......................... 119/20, 256/25, 280/30
[51] Int. Cl. ............................................... A01k 1/02
[58] Field of Search ........................... 256/24, 25, 26; 119/20, 99, 82; 280/30

[56] References Cited

UNITED STATES PATENTS

| 256,661 | 4/1882 | Tarragon | 119/20 |
| 795,503 | 7/1905 | Garethun | 119/20 |
| 2,678,629 | 5/1954 | Meyer | 119/20 |
| 2,935,965 | 5/1960 | Smith | 119/82 |

FOREIGN PATENTS OR APPLICATIONS

| 231,793 | 1/1961 | Australia | 119/20 |

Primary Examiner—Dennis L. Taylor
Attorney—Pastoriza & Kelly

[57] ABSTRACT

A series of fence panels carried by a vehicle for transporting animals may be assembled to a vehicle wall and linked with one another to constitute a corral enclosure. To minimize problems in connection with storage and assembling the fence panels, some fence panels are pivotally secured directly to the vehicle for movement between retracted positions against the vehicle wall and selected extended positions.

7 Claims, 3 Drawing Figures

PATENTED APR 10 1973 3,726,256

INVENTORS
BLAISE BERNHARDT
DONALD HOUSE
BY Pastoriza & Kelly,
ATTORNEYS.

3,726,256

DEMOUNTABLE HORSE CORRAL AND TRAILER STRUCTURE

BACKGROUND OF THE INVENTION

This invention relates to portable enclosures and more specifically to an animal corral carried on an animal transportation vehicle which can be dismantled and reassembled as the animals are moved from place to place.

When an animal such as a race horse is being transported on a long journey it becomes necessary periodically to permit the animal to run around and exercise. In order to prevent the animal from running away it is common for a trailer used in transporting the animal to be equipped with pen or fence sections that can be assembled as a corral to confine the animal.

Conventional fence assemblies are generally time consuming and tedious to erect and require considerable handling. Furthermore, the numerous fence sections are usually required and each section is generally of shallow or intermediate height so that a tall or especially exuberant animal is able to leap over the corral and escape.

SUMMARY OF THE INVENTION

Briefly stated this invention is a simple, economical and versatile corral that can be conveniently transported from place to place with an animal trailer and swiftly erected and combined with the trailer to form an enclosure for confining animals.

In its broadest aspects the invention includes a vehicle which may be a trailer or self propelled vehicle for transporting animals, having a roof, a front wall, a rear wall, a pair of sidewalls and at least one door through which animals may enter or egress from the vehicle interior. A plurality of fence panels carried by the vehicle in a disassembled condition may be erected and arranged with at least two fence panels coupled directly to the vehicle. The remaining fence panels can be detachably coupled to one another as well as to the two fence panels coupled directly to the vehicle. An enclosure for confining the animals is constituted by the coaction between the panels and at least one wall of the vehicle.

Preferably the two fence panels coupled to the vehicle are pivotally coupled adjacent end portions of one vehicle wall. The vehicle wall may be a sidewall that mounts a holding means at an intermediate location for holding down the two fence panels when they are pivoted inwardly towards one another and held relatively flat against the vehicle sidewall.

Four fence panels may be pivotally coupled adjacent the four corners of the vehicle to assist in allowing a wide variety of corral configurations to be erected.

A rack is mounted on the vehicle roof so that when the fence panels, other than those pivotally secured to the vehicle, are uncoupled from one another they may be stacked upon one another and held stably and securely by the rack.

Each fence panel includes a pair of spaced and parallel tubular columns rigidly fixed to a plurality of intermediate cross pieces. The bottom portions of the columns are formed with a series of height adjustment openings and support stakes extending through the column bottom portions are also formed with a set of height adjustment openings. When corresponding height adjustment openings of the columns and support stakes are brought into registering alignment then connector pins are inserted to maintain the desired structural relationship.

The corral configuration can be quickly assembled for use in one location, disassembled for movement with the animals from place to place and then reassembled for use in a different selected location.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENTS

Figure 1:
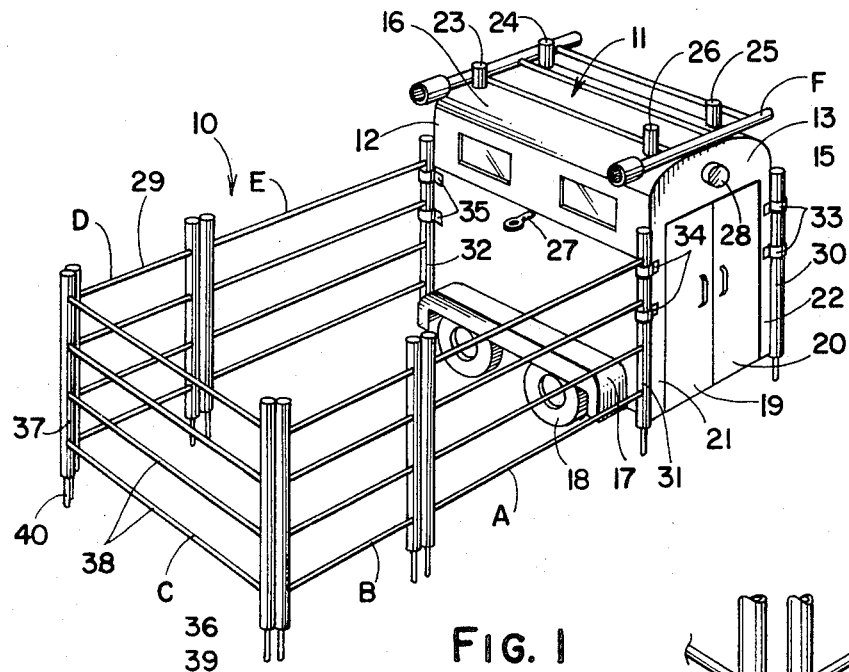
FIG. 1 is a perspective view showing an animal enclosure constituted by a wall of the trailer and a corral having a plurality of fence panels.

Referring now to FIG. 1 a first embodiment of a demountable horse corral and trailer structure 10 is shown. A horse trailer 11 of conventional configuration has a front wall 12, a rear wall 13, one sidewall 14 opposing sidewall 15, and a roof 16 to shelter one or more animals contained by trailer 11. A fender 17 mounted to sidewall 14 partially covers a pair of tandem wheels 18.

A pair of doors 19 and 20 are hinged to vertically extending mounting strips 21 and 22. Mounting strips 21 and 22 are joined to the rearward portions of trailer sidewalls 14 and 15 to constitute two of the four vertical trailer corners.

Rather than being a trailer 10 or van hitchable to a draw vehicle such as an automobile or truck, the vehicle for transporting the horses or other animals may be a self-propelled unitary structure.

Fixed to and rising upwardly from the four corner sections of roof 16 are four retaining studs, 23, 24, 25 and 26 that together constitute a rack on which a plurality of disassembled fence panels may be stacked as shall be explained. A holding means 27 shown in the form of an eyebolt is positioned in the center of sidewall 14 for assisting in holding certain fence panels immobile and flush against wall 14 as shall be explained. The holding means could alternatively be a spring clip, lock, brace or any other structure for independently or in association with other devices holding down fence panels. An alarm system 28 suitably coupled to trailer 11 is electrically wired to a plurality of assembled corral fence panels and operates to impart a signal upon "break out" by a horse from the corral enclosure.

A corral 29 has a series of detachable fence panels A, B, C, D, and E which when combined with trailer wall panel 14 constitute a corral enclosure for confining the horses. An upper tier fence panel F shown temporarily stored or held by the roof mounted rack will be further described in connection with FIG. 2.

Tubular columns 30, 31 and 32 all associated with individual fence panels are pivotally coupled to the three trailer corners shown. The corner which is concealed also mounts a tubular column. Two collars or braces 33 secured to sidewall 15 and mounting strip 22 operate to pivotally mount column 30. In a similar manner collars or braces 34 and 35 pivotally mount corresponding tubular columns 31 and 32. The four pivotally mounted columns are structurally oriented with respect to their associated trailer corners so that the fence panels of which they are a component may be swung through arcs of approximately 270°. As shall be explained this wide range swinging action permits a horse trainer or other attendant to erect corral enclosure structures of broadly varying sizes and configurations to accommodate the horses. Columns 31 and 32 may be selectively pivoted to swing fence panels A and E inwardly towards one another and against sidewall 14 where they may be lashed or otherwise secured to holding means 27.

Inasmuch as fence panel C is generally constructed like the other fence panels a description of it will suffice for an understanding of how all the fence panels incorporated in the corral 29 of FIG. 1 are structured. A pair of spaced and parallel tubular columns 36 and 37 are held in their respective positions by a plurality of intermediate rigid cross pieces or bars 38. As shall be more fully explained in connection with FIG. 3 the bottom sections of columns 36 and 37 are sized to admit support stakes 39 and 40 used for height adjustment purposes and to anchor and stabilize the fence panels. The individual fence panels are detachably coupled with one another at their abutting ends.

Figure 2:
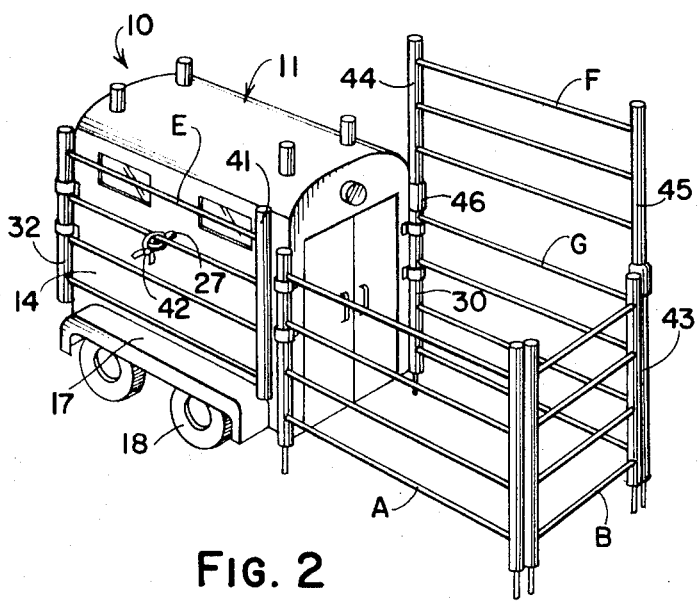
FIG. 2 is a perspective view showing how a corral enclosure of different configuration can be erected by using a different trailer wall and a series of fence panels; and, FIG. 3 is a fragmentary view of a typical corral enclosure corner constituted by a pair of adjacent fence panels.

FIG. 2 shows a different corral enclosure configuration constituted by some of the fence panels employed in the FIG. 1 corral enclosure configuration. Fence panel E is shown swung inwardly against sidewall 14 with a cord 42 drawn through the eyebolt of holding means 27 and around one of the cross bars in order to hold fence panel E against undesired movements. In order to provide sufficient clearance over fender 17, in situations where it is desired to use a fender, fence panel E may be sufficiently hoisted by a distance equal to the spacing between adjacent cross bars before fence panel E is pivoted to its position of FIG. 2. During travel periods fence panel A would likewise be swung inwardly and held substantially flat against sidewall 14 with inner end portions of panels A and E oriented in overlapping relationship. The fence panels may be of equal or different lengths.

For purposes of clarity only a single upper tier fence panel F has been shown on the rack in FIG. 1 and in its operation position in FIG. 2. In some situations it would be desirable to erect a taller corral enclosure wall where, for example,the animals are especially tall or able to jump through great heights. Fence panel F has a pair of tubular columns 44 and 45 aligned coaxially with the tubular columns 30 and 43 of a fence panel G that has been swung through a 180° arc from its position in FIG. 1. The bottom portions of columns 44 and 45 are configured with enlarged sockets 46 and 47 that telescopically fit over the top sections of columns 30 and 43. Fence panel F can be easily assembled on and removed from fence panel G.

Figure 3:
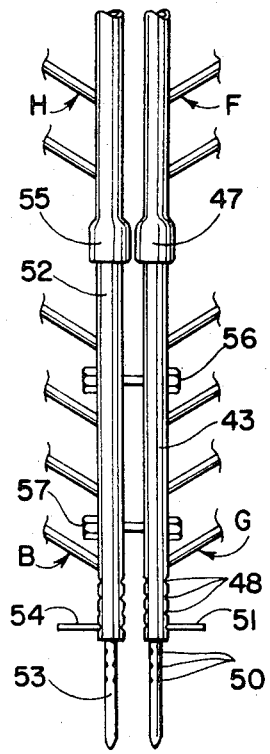

Referring now to FIG. 3 a typical corner joint is shown as constituted by fence panels B and G by way of example. Fence panel F and another adjacent upper tier fence panel H are shown positioned on top of panels G and B respectively.

The lower portion of column 43 is formed with a series of vertically spaced height adjustment openings 48. A support stake 49 also has a series of height adjustment openings 50. To maintain column 43 at a desired height above the ground the corresponding sets of height adjustment openings 48 and 50 are brought into registration and then a connector pin 10 is inserted through them. In a similar manner fence panel B is equipped with a support stake 53, connector pin 54 and sets of height adjustment openings.

While the lower tier fence panels B and G may be detachably coupled by any suitable type of integral or external fasteners, they are shown for purposes of illustration connected by an upper nut and bolt assembly 56 and a lower nut and bolt assembly 57.

OPERATION

Keeping the above construction in mind it can be understood how previously described disadvantages of conventional horse trailers and independent fences are overcome or substantially eliminated by the present invention.

During traveling times when the trailer 10 or other vehicle is being used for transporting one or more horses or other animals, the four pivotable fence panels at the trailer corners would be arranged in flattened positions against the trailer sidewalls and the other fence panels including upper tier fence panels, if any, would be stacked on one another and secured to the rack on roof 16.

If during transit it became desirable to stop for the evening or to permit the horses to romp about and exercise the panels would be unstacked from the roof rack and coupled to selected pivoted fence panels to erect a corral enclosure of desired shape. Under all circumstances one or more walls of trailer 10 would constitute a segment of the corral enclosure. Not only does this combination eliminate the need for extra fence panels but in addition it facilitates assembling the corral enclosure because two or more of the pivoted fence panels may be quickly swung to assume desired orientations.

The support stakes would be adjusted or regulated to accommodate desired height needs and also to handle any irregular terrain situations.

If the animals being transported are tall or can leap over average size walls then the animal trainer or attendant would probably elect to position a series of upper tier fence panels such as panels F and H shown in FIG. 3 on associated lower fence panels.

If an animal breaks through a cross bar then this force will interrupt or complete an electrical circuit causing a signal to be imparted by alarm system 28.

In circumstances where there may be a threat of inclement weather the corral configuration shown in FIG. 2 would be preferred so that the animals could simply seek shelter in trailer 11, assuming that the doors 19 and 20 were left open, when it began raining or becoming too cold.

It can now be appreciated that the demountable horse corral and trailer structure of this invention may be advantageously used to transport horses conveniently from place to place. The corral enclosure can be quickly assembled for use in one location, disassembled for movement to another location and there reassembled in either the same or a different selected corral enclosure configuration.

From the foregoing it will be evident that the present invention has provided a demountable horse corral and trailer structure in which all of the various advantages are fully realized.

What is claimed is:

1. A demountable animal corral enclosure system comprising:
   a. a vehicle for transporting animals having a roof, a front wall, a rear wall, a pair of side walls and at least one door through which animals may enter or egress from the vehicle interior;
   b. a plurality of fence panels arranged with at least two fence panels directly coupled to the vehicle and the remaining fence panels detachably coupled to said two fence panels and with one another; and,
   c. said two fence panels directly coupled to the vehicle are pivotally coupled to the rear wall on opposite sides of the door so that if the door is open the animals can move directly from the vehicle interior into the corral enclosure,
      wherein the fence panels and vehicle are aligned and combined to constitute a corral enclosure for confining animals.

2. The structure according to claim 1, wherein:
said fence panels directly coupled to the vehicle are pivotally coupled adjacent opposing end portions of a first vehicle sidewall.

3. The structure according to claim 2, including:
pivot means, and;
holding means carried by the first vehicle sidewall at an intermediate location to hold down said two fence panels when they are pivoted inwardly towards one another and swung generally flat against the first sidewall.

4. The structure according to claim 1, including:
fence panels pivotally connected adjacent all four corners of the vehicle so that the configuration and location of the corral enclosure may be changed to accommodate varying needs; and,
a rack mounted on the roof for retaining disassembled fence panels in stacked relationship.

5. The structure according to claim 1, wherein each fence panel includes:
   a pair of spaced parallel tubular columns with first height adjustment openings extending through their bottom sections;
   plural cross pieces extending between and secured to the tubular columns;
   support stakes with second height adjustment openings fitting into corresponding tubular column bottom sections; and,
   pins extending through selected sets of first and second height adjustment openings to maintain the columns at selected heights.

6. The structure according to claim 5, including:
an upper tier fence panel having a pair of spaced parallel columns terminating at their bottom ends in enlarged sockets shaped to fit telescopically over the top sections of said fence panel in order to constitute a tall corral enclosure portion.

7. A demountable corral enclosure system comprising:
   a. a trailer for transporting horses having a roof, a front wall, a rear wall, a pair of sidewalls, four corners and at least one door through which horses may enter or egress from the trailer interior;
   b. a plurality of fence panels wherein four fence panels are pivotally connected to the trailer adjacent the four corners and the other fence panels are detachably coupled to one another and to at least two of the four pivoted fence panels, wherein each fence panel includes;
      b 1. a pair of spaced parallel tubular columns with first adjustment openings extending through their bottom sections,
      b 2. plural cross pieces extending through and secured to the tubular columns,
      b 3. support stakes with second height adjustment openings fitting into corresponding column bottom sections; and,
      b 4. pins extending through selected sets of first and second height adjustment openings to maintain the columns at selected heights.
   c. holding means carried by at least one of the trailer sidewalls at an intermediate location to assist in holding down two pivoted fence panels when they are pivoted inwardly towards one another from opposing corners and laid relatively flat against the trailer sidewall;
   d. a rack mounted on the vehicle roof for retaining disassembled fence panels in stacked relationship.

* * * * *